(12) United States Patent
Jin et al.

(10) Patent No.: US 11,887,686 B2
(45) Date of Patent: Jan. 30, 2024

(54) FAST AND EFFICIENT SYSTEM AND METHOD FOR DETECTING AND PREDICTING ROWHAMMER ATTACKS

(71) Applicants: University of Florida Research Foundation, Incorporated, Gainesville, FL (US); Washington University, St. Louis, MO (US)

(72) Inventors: Yier Jin, Gainesville, FL (US); Yichen Jiang, Gainesville, FL (US); Xuan Zhang, St. Louis, MO (US); Huifeng Zhu, St. Louis, MO (US); Xiaolong Guo, Gainesville, FL (US)

(73) Assignees: University of Florida Research Foundation, Incorporated, Gainesville, FL (US); Washington University, St. Louis, MI (US)

( * ) Notice: Subject to any disclaimer, the term of this patent is extended or adjusted under 35 U.S.C. 154(b) by 385 days.

(21) Appl. No.: 17/357,265

(22) Filed: Jun. 24, 2021

(65) Prior Publication Data
US 2021/0406384 A1 Dec. 30, 2021

Related U.S. Application Data

(60) Provisional application No. 63/044,195, filed on Jun. 25, 2020.

(51) Int. Cl.
*G06F 21/57* (2013.01)
*G11C 11/406* (2006.01)
(Continued)

(52) U.S. Cl.
CPC .............. *G11C 29/52* (2013.01); *G11C 7/24* (2013.01); *G11C 11/4076* (2013.01);
(Continued)

(58) Field of Classification Search
CPC ..... G11C 29/52; G11C 7/24; G11C 11/40611; G11C 11/4076; G11C 11/4078; G11C 11/4096; G11C 29/04; G11C 29/20
(Continued)

(56) References Cited

U.S. PATENT DOCUMENTS

2021/0200460 A1\* 7/2021 Lu .................... G06F 3/0653
2022/0050793 A1\* 2/2022 Saroiu ............... G06F 12/0893
(Continued)

*Primary Examiner* — Ly D Pham
(74) *Attorney, Agent, or Firm* — Alston & Bird LLP

(57) ABSTRACT

Embodiments provide for predicting rowhammer attack vulnerability of one or more memory cells of a direct random access memory (DRAM) chip, the DRAM chip including a plurality of memory cells. An example method, determines, for each memory cell of a subset of memory cells of the plurality of memory cells, a leakage time t, a resistance of intrinsic leakage $R_L$ based at least in part on the leakage time t, an activation time of an adjacent aggressor row to flip a bit in the memory cell, a resistance of coupling leaking $R_{SW}$ based at least in part on the activation time, and a toggling count. The method identifies, based at least in part on one or more of the $R_{SW}$, $R_L$, or toggling count, whether the direct random memory access (DRAM) chip is vulnerable to a rowhammer attack.

18 Claims, 14 Drawing Sheets

(51) Int. Cl.
  *G11C 11/4076* (2006.01)
  *G11C 29/52* (2006.01)
  *G11C 11/4096* (2006.01)
  *G11C 7/24* (2006.01)
  *G11C 11/4078* (2006.01)
  *G11C 29/04* (2006.01)
  *G11C 29/20* (2006.01)

(52) U.S. Cl.
  CPC ...... *G11C 11/4078* (2013.01); *G11C 11/4096* (2013.01); *G11C 11/40611* (2013.01); *G11C 29/04* (2013.01); *G11C 29/20* (2013.01)

(58) Field of Classification Search
  USPC .......................................................... 365/149
  See application file for complete search history.

(56) References Cited

U.S. PATENT DOCUMENTS

2022/0068348 A1\* 3/2022 Bennett ............... G11C 11/4096
2022/0148646 A1\* 5/2022 Noguchi ........... G11C 11/40622

\* cited by examiner

```
int find_leakage_time(target_addr) {
    /* Iterate over possible leakage times */
    for (t = LEAKAGE_MIN --> LEAKAGE_MAX) {
        /* Set every cell in the target row */
        set_target_row(target_addr);
        sleep(t);
        /* Check any cell in the target row
           and exit if a cell has leaked */
        if (check_target_row(target_addr))
            return t;
    }
}
```

Figure 8

```
int find_aggressor_count(victim_addr) {
    /* Set value in the victim row to 0xFF */
    set_target_row(victim_addr);
    /* Iteratively activate aggressor rows */
    for (num_actvs = ACTVS_MIN -> ACTVS_MAX) {
        /* Double-sided Rowhammer attack */
        read_aggressor_row(victim_addr - 1);
        read_aggressor_row(victim_addr + 1);
        /* Check every cell in the victim row
           and break if a cell has leaked */
        if (check_victim_row(victim_addr))
            return num_actvs;
    }
}
```

Figure 9

FAST AND EFFICIENT SYSTEM AND METHOD FOR DETECTING AND PREDICTING ROWHAMMER ATTACKS

CROSS-REFERENCE TO RELATED APPLICATIONS

The present application claims priority to U.S. Provisional Application Ser. No. 63/044,195, titled "A FAST AND EFFICIENT SYSTEM AND METHOD FOR DETECTING AND PREDICTING ROWHAMMER ATTACKS," filed Jun. 25, 2020, the contents of which are incorporated herein by reference in their entirety.

FIELD

The present invention relates to dynamic random access memory (DRAM) security and, more particularly, to prediction and detection of rowhammer attacks on dynamic random-access memory (DRAM) chips.

BACKGROUND

A rowhammer attack (e.g., also referred to as a row hammer attack) is a memory-based attack that takes advantage of a vulnerability of a dynamic random access memory (DRAM) in which memory cells of the DRAM leak their charges due to interactions occurring between the memory cells (e.g., a memory cell may leak or change the contents of a nearby memory row that was not addressed in an original memory access). An attacker exploits these capacitive-coupling vulnerabilities by accessing adjacent rows of a target DRAM for a sufficiently long period of time to trigger bit flip faults before an automatic memory refresh is performed. For example, specially crafted memory access patterns that rapidly activate the same memory rows numerous times may trigger a bypass of isolation between DRAM memory cells.

Understanding of the aforementioned vulnerabilities (e.g., leading to the ability to perform rowhammer attacks) has led to more advanced attacks such as privilege leakage, distributed denial-of-service (DDoS) attacks (e.g., multiple systems flooding the bandwidth or resources of a targeted system), control flow hijacking, and the like. The widespread usage of DRAM in almost all computing systems makes rowhammer attacks applicable to a wide variety of different devices and platforms. For example, mobile phones are vulnerable to such attacks, as are cloud environments and high-performance computing systems.

Conventionally, rowhammer attack detection is performed on an entire DRAM chip to identify vulnerable cells, and then machine learning is used to build a model for prediction in other DRAM chips. Existing methods lack a circuit-level explanation of the capacitive-coupling phenomenon in modern DRAMs.

Given that the rowhammer attack imposes threats to architecture security, various solutions have been proposed. Despite the effectiveness of these countermeasures, none of the previous solutions are able to explain the fundamental cause of the rowhammer attack, relying instead on a hypothesis. That is, the rowhammer attack is caused by the capacitive-coupling effect between the adjacent DRAM rows. However, there lacks a thorough analysis to explain the capacitive-coupling phenomenon in modern DRAMs at the circuit level. Without such an in-depth understanding, there exists a risk that the impact of the rowhammer attack can be over-exaggerated (or underestimated). Furthermore, previous prediction models on rowhammer attacks are often constructed based on a massive amount of measurements which is neither efficient nor accurate when applying the model to a large set of DRAM chips.

There is, accordingly, a need for more efficient attack prediction and detection that can generate a prediction model using only a portion of a given DRAM chip, where the prediction model is applicable to other DRAM chips.

SUMMARY

Embodiments of the present disclosure relate to predicting efficiently and accurately those memory cells of a DRAM chip that are vulnerable cells, where the prediction is based on a portion of, as opposed to an entirety of, the DRAM chip (e.g., a subset of the cells of the DRAM chip). Unlike conventional techniques for rowhammer detection and prediction, embodiments of the present disclosure may generate a prediction model, based on a portion of a given DRAM chip, for other DRAM chips.

Embodiments of the present disclosure identify factors, such as equivalent resistance of coupling leakage ($R_{SW}$) and equivalent resistance of intrinsic leakage ($R_L$), influence vulnerable cells of a DRAM chip.

In an example embodiment, a leakage time t is measured for each memory cell of a subset of memory cells of a plurality of memory cells of the DRAM chip. A resistance of intrinsic leakage $R_L$ is calculated based on the leakage time t for the subset of memory cells. A toggling count is measured for each memory cell of the subset of memory cells. A resistance of coupling leaking $R_{SW}$ for the DRAM chip is calculated based on the resistance of intrinsic leakage $R_L$ and the toggling counts for the subset of memory cells. Based on the $R_{SW}$, the direct random memory access (DRAM) chip is identified as vulnerable to a rowhammer attack or not vulnerable to the rowhammer attack.

It will be appreciated that the present disclosure is applicable to DRAM chips of different manufacturers. That is, embodiments of the present disclosure are manufacturer agnostic.

BRIEF DESCRIPTION OF THE DRAWINGS

FIG. 8 illustrates an example process for determining leakage time, according to various embodiments.

FIG. 9 illustrates an example process for determining a number of aggressor row activations required to compute $R_{SW}$, according to embodiments of the present disclosure.

DETAILED DESCRIPTION

Figures 1A, 1B, 1C:
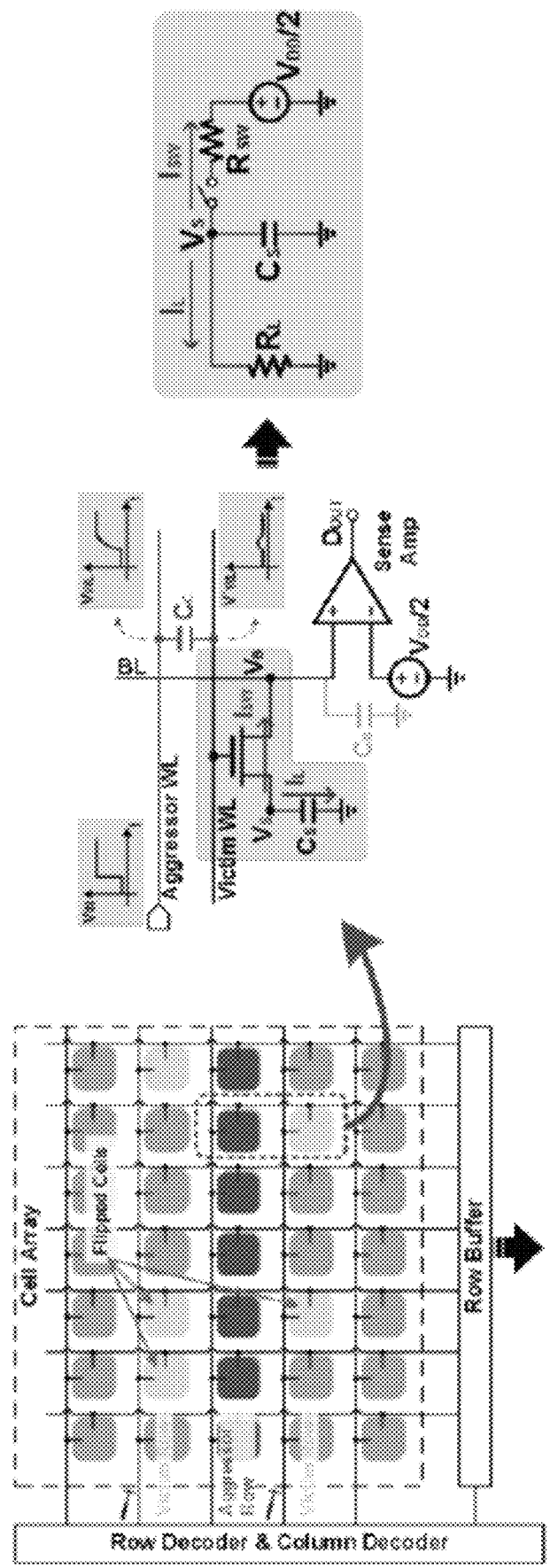
FIG. 1A shows a circuit schematic of an example DRAM chip.
FIG. 1B shows a schematic of an example DRAM memory cell.
FIG. 1C shows an abstracted circuit-level model of an example rowhammer attack, according to embodiments of the present disclosure.
Figure 2A:
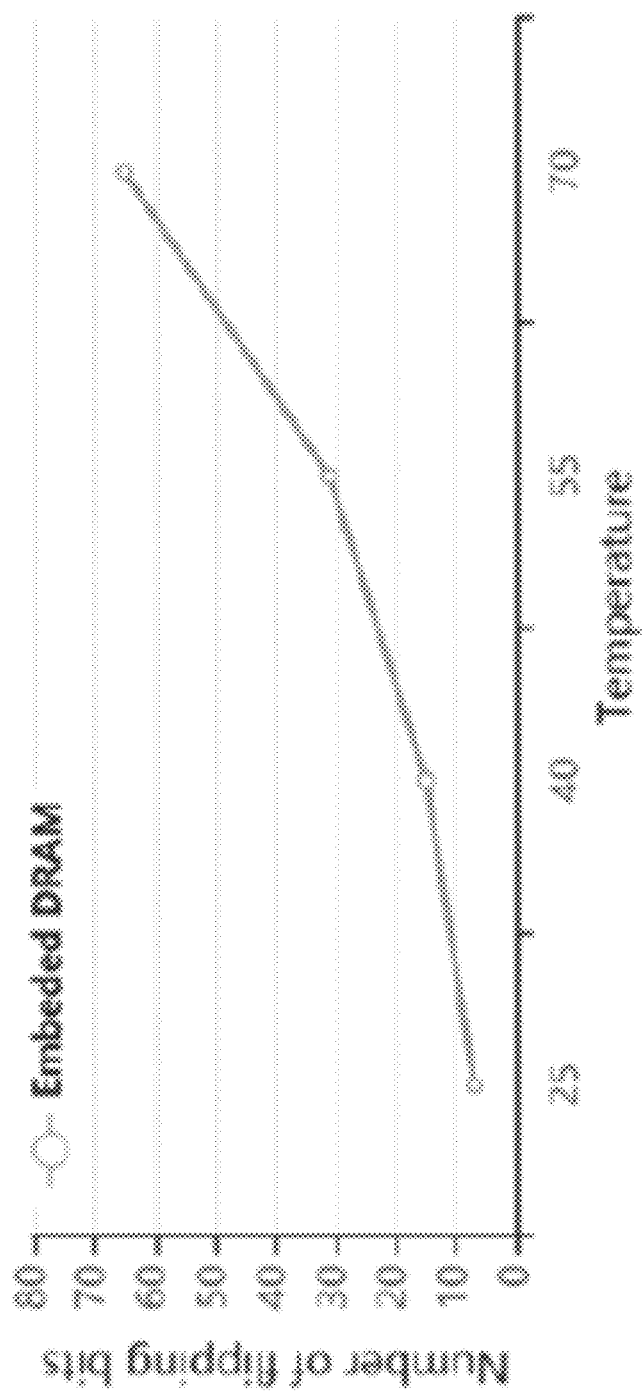
FIG. 2A shows example total bit flipping numbers with increase in temperature for an embedded DRAM.
Figure 2B:
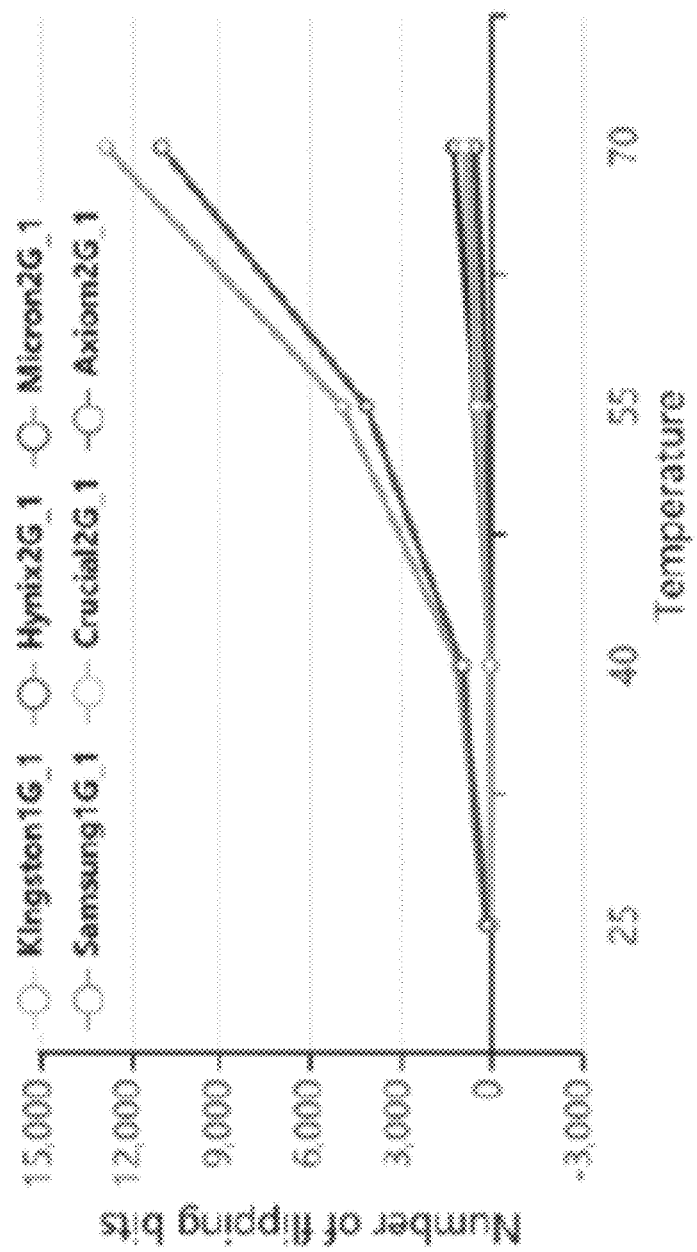
FIG. 2B shows example total bit flipping numbers with increase in temperature for different DRAMs.

Embodiments of the present disclosure provide an identification and prediction framework based on an analytical model of capacitive-coupling vulnerabilities in DRAMs. All parameters are analyzed in a mathematical model contributing to the rowhammer vulnerabilities and the parameters are quantified through DRAM measurements.

The rowhammer attack has demonstrated that a specially crafted workload could flip bits in DRAM memory cells without accessing them. As opposed to software-level attacks, the rowhammer attack does not exploit software errors but rather low-level circuit side-effects. It was found that a parasitic capacitance could be induced to turn on the access transistor of victim cell by repeatedly accessing physically adjacent rows to a victim row. Researchers have used the rowhammer vulnerability to launch advanced attacks such as privilege escalation, distributed denial-of-service (DDoS) attacks, and the like. The wide use of DRAM in computing systems makes rowhammer attacks applicable to a wide range of devices and platforms. For example, the mobile phone and cloud and high-performance computing systems have been shown to be vulnerable to such attacks.

Given the pervasive threat the rowhammer attack poses to architecture security, various solutions have been proposed. However, these countermeasures aim to prevent, not characterize, rowhammer attacks. There lacks a comprehensive, quantitative circuit-model capable of providing insight into the susceptibility of a DRAM cell to rowhammer. Statistical modelling has been introduced, but it is not efficient nor accurate when applied to a large set of DRAM chips despite massive amounts of measurement data.

To address the above-mentioned problems, embodiments of the present disclosure provide an analytical model that simulates all parameters of the capacitive-coupling phenomenon at the circuit level. Two parameters for all DRAM chips are defined herein: (1) equivalent resistance of coupling leakage ($R_L$), and (2) equivalent resistance of intrinsic leakage ($R_{SW}$). These two parameters help accurately evaluate the capacitive-coupling phenomenon and to explain the cause of rowhammer attacks. The equivalent resistance of coupling leakage describes the capacitor's resistance against toggling operations in each DRAM cell and the equivalent resistance of intrinsic leakage describes the DRAM data retention. The present disclosure advantageously exposes mathematical relations between the toggling operation and DRAM data retention capability.

Embodiments of the present disclosure further provide a framework for predicting and evaluating the capacitive-coupling based DRAM vulnerability. Supported by this framework, toggling counts are precisely predicted for an arbitrary DRAM chip covering a large set of DRAM brands. Further, the framework reveals that DRAM chips of the same manufacturing code have very similar equivalent resistance of coupling leakage values and share the same DRAM vulnerabilities against rowhammer attacks, a key finding to help predict the DRAM security against rowhammer attacks.

Results are presented herein based on a wide range of DRAM brands from various manufacturers including Samsung, Kingston, Hynix, Micron, Axiom, Corsair, as well as integrated Micron DRAMs in the Xilinx ZC-706 FPGA board.

In embodiments herein, in rowhammer and rowhammer enabled attacks, it is assumed that the adversary can exploit the capacitive-coupling effect in the target system. The target system can be any devices/computers equipped with DRAMs ranging from embedded systems, personal computers, to the high-performance computing systems in the cloud or a data center. It is further assumed that the operating system and applications are installed appropriately in the target systems. Other operating environment factors such as the temperature are properly maintained. From the attacker's perspective, they will access the machine through remote access or software implementations. By exploiting the rowhammer vulnerabilities, attackers can break the confidentiality and integrity of the system, e.g., escalating privilege, accessing protected pages and cryptographic keys, hijacking control-flows, as well as performing denial-of-service attacks.

FIG. 1A shows a circuit schematic of an example DRAM chip. The example DRAM chip in FIG. 1A is composed of three parts: the decoder, the row buffer, and the cell array. FIG. 1B shows a schematic of an example DRAM memory cell. The decoder drives the cell array and reads or writes data to the corresponding DRAM cells with the aid of row buffer. Each DRAM cell contains one capacitor that is connected to the bit line (BL) through an access transistor. The bit lines (also called digit line or column line) are arranged vertically and each line is shared by multiple rows of DRAM cells. The access transistors are controlled by a row decoder through word lines (also called row line), which is layout horizontally and shared by columns.

When the word line is activated, the access transistor in FIG. 1B is turned on, making the storage capacitor $C_S$ connected to the bit line. The stored binary value will be decided by the sense amplifier by comparing the charge stored on the capacitor with a reference voltage. In modern DRAM circuit, the charges stored in the capacitor equal to $Q=0$ or $Q=+V_{DD} \times C_S$. A high voltage will be detected if $Q>+(V_{DD}/2) \times C_S$ while a low voltage will be detected if $Q<+(V_{DD}/2) \times C_S$. It is also possible that the DRAM cell capacitor will be connected to $V_{DD}/2$ instead of the ground. In this case, the stored charges in each cell will be $Q=\pm (V_{DD}/2) \times C_S$. The capacitor will slowly lose the charge due to various reasons, e.g., the leakage current. Therefore, a periodical refresh operation is necessary to keep the stored data in the DRAM cell capacitor. The refresh operation interval is typically set to 64 ms (e.g., all DRAM rows will be refreshed every 64 ms in sequence).

Capacitive-coupling vulnerabilities belong to a newly developed charge-domain analog vulnerability. This type of vulnerability utilizes the subtle analog behaviors in the low-level circuits to induce unexpected, often malicious, electrical charge transfers and/or redistribution for fault injections. More specifically, the capacitive-coupling vulnerability relies on capacitive coupling effects associated with the parasitic capacitors in digital circuits and the rowhammer attack is one typical example of such vulnerability. As shown in FIGS. 1A and 1B, the matrix structure of DRAM cell arrays creates the parasitic capacitor between two long word lines which becomes the key trigger of rowhammer attacks. When activating a specific word line, named as the Aggressor WL in FIGS. 1A and 1B, voltage fluctuations are induced on its adjacent word line, named as Victim WL, due to the parasitic coupling capacitance CC between these two word lines. As a result, the accessing transistors of the victim row can be partially opened to leak the charges stored in the cell. The charge leakage in the victim cell will be more significant when the Aggressor Row is accessed at a high frequency. If the accumulated leakage is above a threshold, the bit will be flipped and a rowhammer attack is successfully performed.

There are several ways to perform the rowhammer attack against victim cells, including single-side, double-side, and many-sided. For the single-side rowhammer attack, the attacker will read one Aggressor Row at a high frequency to cause some bits of the neighboring victim rows to be flipped. In real attack scenarios, the attacker needs to alternatively read from the Aggressor Row and another random row from the same bank to avoid the impact of the row buffer. The many-sided Rowhammer attack builds upon the previous techniques by using many aggressor rows to trigger Rowhammer and bypass a defense called Target Row Refresh implemented on newer DDR chips.

To further improve the attack speed, the double-side rowhammer attack was proposed which aggressively activates the adjacent two Aggressor Rows of the Victim Row. The frequent accesses to the Aggressor Row(s) is denoted as the toggling operation targeting the Victim Row. For both attack methods, the "clflush" or equal operations are required to make the reading operation access the data directly from the DRAM instead of the cache.

One Target Row Refresh (TRR) protection mechanism which monitors the access time of rows in one refresh interval has been discussed. If recorded access time of one row within 64 ms is beyond the secure access number that stored in the Serial Presence Detect (SPD) of the DRAM, one or more extra refresh operation is generated to refresh the adjacent rows of that row. For this TRR mechanism, an extra buffer (or sampler) inside the DRAM is required to store the information of the access time for the rows. Since the sampler size is limited, the row information recorded in the sampler is limited as well. If accessing a group of rows inside a refresh interval concurrently, it can overwhelm the sampler and bypass the TRR mechanism. Thus, the many-side Rowhammer (also called n-side Rowhammer where n denotes the number of the aggressive rows) is proposed. In the many-side row hammer attack, several aggressive rows are accessed in one refresh interval and the aggressive row and victim row follow the pattern as: AVAVAVA (A is for aggressive, and V is for victim). Due to the limited size of the sampler, some aggressive rows are not recorded in the sampler. Hence, the aggressive rows which is not recorded have the high possibility to flip the bits in their adjacent victim rows.

FIG. 1C shows an abstracted circuit model of an example rowhammer attack, according to embodiments of the present disclosure. Example model parameters are listed in Table 1.

TABLE 1

Model Parameters

| Parameter | Description |
|---|---|
| $R_{SW}$ | Equivalent resistance of coupling leakage |
| $R_L$ | Equivalent resistance of intrinsic leakage |
| $I_{SW}$ | Coupling leakage current |
| $I_L$ | Discharging current |
| $V_{DD}$ | Power supply voltage |
| $V_S$ | Voltage of the storage capacitor |
| $C_S$ | Capacitance of the storage capacitor |
| $N_{att}$ | Total toggling counts |
| $t_I$ | Interval between successive accessing |

In embodiments of the present disclosure, an example model includes two dominant leakage current paths in a DRAM cell under rowhammer attacks: the discharge current $I_L$ due to the intrinsic leakage of the storage capacitor, and the coupling leakage current $I_{SW}$ because of the partially closed access transistor. These two leakage paths can be modeled to equivalent resistors, $R_L$ and $R_{SW}$, respectively (see Table 1). The intrinsic leakage, in the form of discharging current $I_L$, exists all the time. Indeed, the DRAM refreshing is designed mainly to compensate for the intrinsic leakages. The leakage caused by the access transistor can be modeled as the equivalent resistor $R_{SW}$ connected with a switch and a voltage source (the amplitude of the voltage source is $V_{DD}/2$ because the bit line is pre-charged to $V_{DD}/2$). When the Aggressor WL is activated (or charged), the access transistor of the Victim Row becomes partially closed for a short period of time due to the capacitive-coupling effects between the two word lines. To capture this effect, in the present model, the switch will be turned on for a short period of time with each toggle of the Aggressor WL, and the charges will also leak from the resistor $R_{SW}$ besides the intrinsic leakage during this period. This state is called the aggressive situation.

Based on the above discussion, corresponding expressions may be derived. That is, during the normal situation, there only exists the intrinsic leakage and the charges of the storage capacitor only leaks through the resistor $R_L$. Given the storage capacitor $C_S$, an RC discharging circuit and its behavior can be expressed by the following equation.

$$V_S(t^1) = e^{-\frac{1}{R_L C_S}(t^1 - t^0)} V_S(t^0) \quad (1)$$

where $V_S(t^0)$ is the initial voltage of the storage capacitor.

In the aggressive situation, a more complex RC discharging circuit model is preferred since the charges leak from both $R_L$ and $R_{SW}$. The corresponding equation is expressed below.

$$\frac{dV_S(t)}{dt} = \frac{1}{C_S}(I_L(t) + I_{SW}(t)) = -\frac{V_S(t)}{R'C_S} + \frac{V_{DD}/2}{R_{SW}C_S} \quad (2)$$

where $$I_L(t) = -\frac{V_S(t)}{R_L}, \quad I_{SW}(t) = -\frac{V_S(t) - V_{DD}/2}{R_{SW}}$$

and $$R' = R_L \| R_{SW}.$$

Given a differential equation with the form $$\frac{dV_S(t)}{dt} = \lambda x(t) + f(t),$$

the solution is $x(t)=e^{\lambda(t-t_0)}x(t_0)+\int_{t_0}^{t}e^{\lambda(t-\tau)}f(\tau)d\tau$. Using this, an analytical expression for the aggressive situation may be expressed as follows.

$$V_S(t^2) = e^{-\frac{1}{R'C_S}(t^2-t^1)}V_S(t^1) + \frac{V_{DD}R'}{2R_{SW}}\left(1 - e^{-\frac{1}{R'C_S}(t^2-t^1)}\right) \quad (3)$$

When the attacker launches the rowhammer attack to repeatedly toggling the Aggressor WL, the mode of charge leakage changes between in both Equation (1) and Equation (3). Assume that the interval of two toggles is $t_1=(t^2-t^1)+(t^1-t^0)=B\Delta t+A\Delta t$, where the normal activation lasts for $A\Delta t$, and the aggressive activation lasts for $B\Delta t$. The storage capacitor voltage after one row activation can be derived by combining Equation (1) and Equation (3).

$$V_S(t^2) = e^{-\frac{1}{R'C_S}(B\Delta t)}V_S(t^1) + \frac{V_{DD}R'}{2R_{SW}}\left(1 - e^{-\frac{1}{R'C_S}(B\Delta t)}\right) = \quad (4)$$

$$e^{-\frac{1}{R'C_S}(B\Delta t)}e^{-\frac{1}{R'C_S}(A\Delta t)}V_S(t^0) + \frac{V_{DD}R'}{2R_{SW}}\left(1 - e^{-\frac{1}{R'C_S}(B\Delta t)}\right)$$

The above equation can be viewed as a recursive formula $V_S(t_i)=f(V_S(t_{i-1}))$ where $V_S(t_i):=V_S(t^2)$ is the voltage after the i-th row activation and $V_S(t_{i-1}):=V_S(t^0)$ is the voltage after the (i−1)-th row activation. By iteratively applying Equation (4), the expression for $V_S$ after $N_{att}$ aggressor row activations can be obtained and expressed as below.

$$V_S(t_N) = \quad (5)$$

$$e^{-N_{att}\frac{1}{C_S}\left(\frac{1}{R_L}+\frac{D}{R_{SW}}\right)t_I}V_{DD} + \frac{V_{DD}R_L}{2(R_L+R_{SW})}\left(1 - e^{-N_{att}\frac{1}{C_S}\left(\frac{1}{R_L}+\frac{1}{R_{SW}}\right)Dt_I}\right)$$

where $$t_N = \sum_{i=0}^{N_{att}} t_i^2 - t_i^0 = N_{att} \times t_I, \text{ and } D = B/(A+B).$$

$V_S(t_N)$ from Equation (5) represents the voltage of the victim cell under a rowhammer attack. At any time, this voltage can be compared with the threshold of the sense amplifier ($V_{DD}/2$) to determine whether the charge on the storage capacitor $C_S$ has leaked. In the present model, a more precise prediction scheme is used that considers both the charge redistribution between the bit line and the storage capacitor and the resolution of the sense amplifier to have the following equation to decide whether a rowhammer attack is successfully performed or not.

$$\begin{cases} V_S(t_N) > k \times \left(\frac{V_{DD}}{2} + V_{SA}\right), \text{ unsuccessful attack} \\ V_S(t_N) < k \times \left(\frac{V_{DD}}{2} - V_{SA}\right), \text{ successful attack} \\ \text{others, uncertain} \end{cases} \quad (6)$$

where $k=(C_S+C_B)/C_S$, $C_B$ is the parasitic capacitance of the bit line, and $V_{SA}$ is the resolution of the sense amplifier.

In the capacitive-coupling model in Equation (5), $N_{att}$ and $t_1$ are parameters controlled by the attacker while $V_{DD}$ and $C_S$ are device-specific features which are available in the DRAM datasheet. Therefore, in order to better understand the capacitive-coupling effect, the two abstracted resistance parameters, $R_{SW}$ and $R_L$, are evaluated or addressed in the present model.

Attribute 1: Both the leakage time of the cell and the activation time of the aggressive rows will effect rowhammer attacks.

The present model shows that the cell leakage time and activation time of aggressive row have influence to the rowhammer attack and $R_L$ and $R_{SW}$ are used to quantity the effect respectively. It is demonstrated below how the leakage time contributes to the rowhammer attack, contradicting to the argument from previous research that leakage time is not important to rowhammer attacks.

Attribute 2: If the cell's $R_{SW}$ and $R_L$ are fixed, the activation time for the adjacent aggressive row to induce bit flipping are determined.

Previous research proves that $R_L$ (the cell leakage time) is affected by different factors, e.g., temperature and data pattern. However, if $R_L$ and $R_{SW}$ are fixed during the attack, as indicated by the present model, the activation time of adjacent aggressive row to flip the cells is determined. As a result, the present model has the conclusion that the aggressive activation time to induce bit flipping is fixed under the same $R_{SW}$ and $R_L$ regardless of the aggressive row access sequence.

Figure 3A:
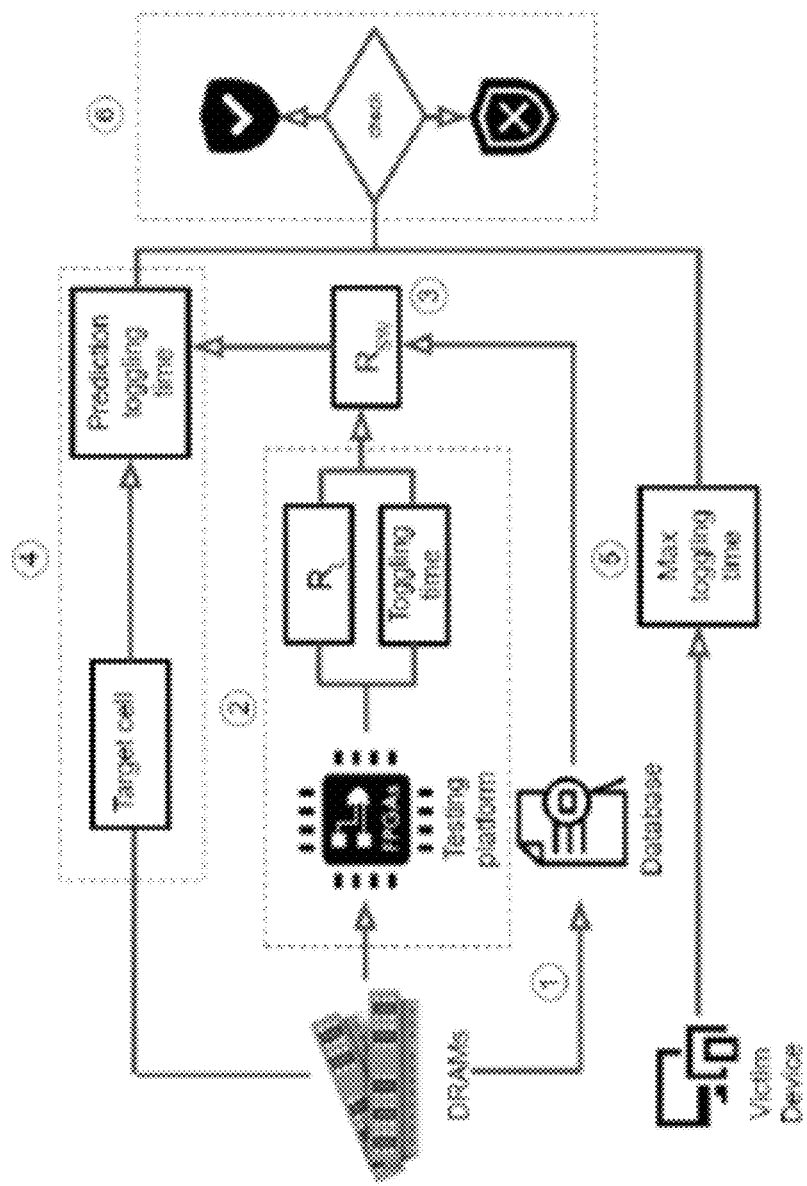
FIGS. 3A-3B are flow diagrams illustrating example operations for predicting whether a given cell inside a DRAM chip is vulnerable to rowhammer attacks based on leakage time and $R_{SW}$, for use with embodiments of the present disclosure.
Figure 3B:
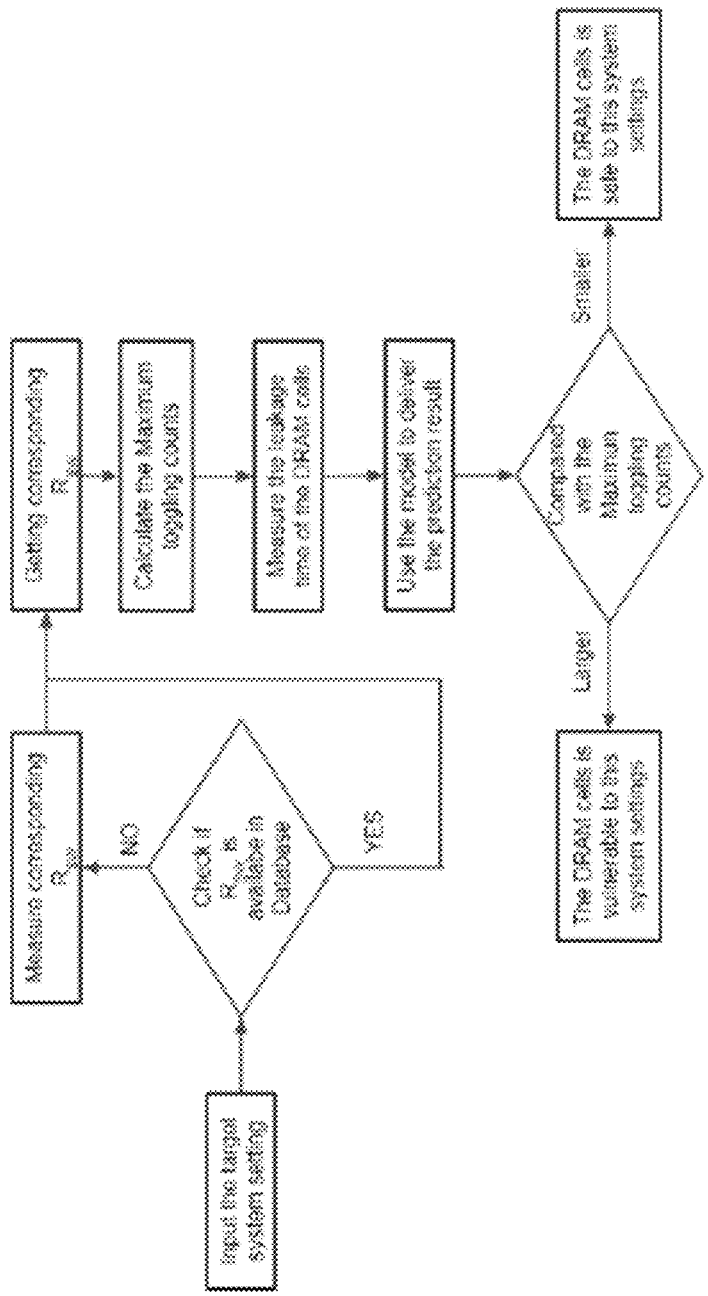

Example Processes and Apparatuses for Detecting and Predicting Vulnerable DRAM Cells FIGS. 3A-3B illustrate example operations for use with embodiments of the present disclosure. In embodiments, a plurality of data structures are stored in a repository, where each data structure comprises a $R_{SW}$ value for a DRAM chip of a plurality of DRAM chips and a manufacturing code for the DRAM chip. The DRAM automatic refreshing mechanism is preferably turned off.

Step 1: Given an arbitrary DRAM with a specific manufacturing code, the repository is queried in order to determine if the $R_{SW}$ is available. If so, the process proceeds to Step 3. Otherwise, the process proceeds to Step 2.

Step 2: The DRAM automatic refreshing mechanism is turned off, and toggling counts and corresponding $R_L$ are determined by randomly selecting a subset (e.g., 10) of target cells in the DRAM.

Step 3: The $R_{SW}$ is either calculated depending on the measured $R_L$ and toggling counts through the equations above or retrieved from the repository.

Step 4: DRAM cells of interest are then chosen (in certain cases, the whole DRAM will be selected covering all memory cells). The leakage time for the selected cells will be measured and the $R_L$ of these cells will be calculated. With $R_L$ and $R_{SW}$ being available, the required toggling counts of the target cell can be calculated or predicted. In case the whole DRAM is being tested, a map will be drawn listing the toggling counts of all DRAM cells.

Step 5: The configurations and working environment of the target DRAM will be collected, mainly the memory access rate and the memory refreshing rate. These configuration parameters will help calculate the maximum toggling counts which can be achieved by an attacker.

Step 6: Finally, the maximum toggling counts are compared with the predicted rowhammer toggling counts. If the maximum toggling is larger than the predicted toggling counts, the target cells are indicated as vulnerable to the rowhammer attack.

Besides the comprehensive prediction results, a general prediction method is also provided to quickly check if a target DRAM chip is vulnerable to the rowhammer attack. Instead of measuring the leakage time of all cells in the DRAM to precisely determine if certain memory cells are vulnerable, the $R_{SW}$ value is used to decide if there exists any cells in the DRAM chips which are vulnerable to rowhammer attacks. The quick prediction method is based on the observations of the minimum leakage time of different DRAMs. That is, the minimum leakage time of different DRAMs do not vary much, ranging from 2 s to 4 s. It is shown that DRAMs having lower $R_{SW}$ are more vulnerable to the rowhammer attack.

An alternative prediction strategy may include performing a rowhammer attack on an arbitrary DRAM. If the test results show that the DRAM is immune to the rowhammer attack, the $R_{SW}$ value is labeled with a safe tag. That is, any DRAM with a larger $R_{SW}$ is immune to the rowhammer attack. On the other hand, if malicious bit flips are detected, then the $R_{SW}$ value is labeled with an unsafe tag. Any DRAM with a smaller $R_{SW}$ is vulnerable to the rowhammer attack. This process is repeated with all available DRAMs to get a rough boundary $R_{SW}$ value such that all DRAMs with a larger value are secure while all DRAMs with a smaller value are vulnerable to rowhammer attacks. As shown via experimental results, a preferred $R_{SW}$ value may be between $1.1 \times 10^{12}$ Ohm and $1.85 \times 10^{12}$ Ohm.

Figure 4:
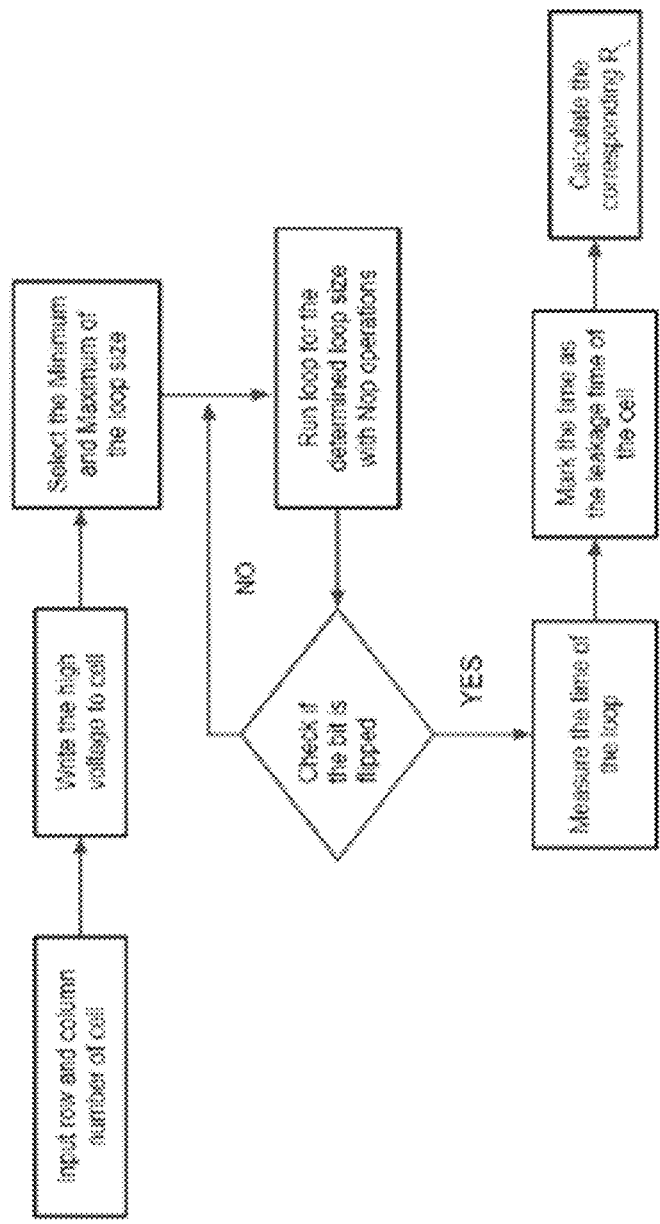
FIG. 4 is a flow diagram illustrating example operations for measuring leakage time of a target memory cell of a DRAM chip, for use with embodiments of the present disclosure.

FIG. 4 is a flow diagram illustrating example operations for measuring leakage time of a target memory cell of a DRAM chip, for use with embodiments of the present disclosure. In order to implement the prediction and evaluation of vulnerable cells of the DRAM, the essential parameters of the model are measured. As FIG. 4 describes, the method measures the leakage time of the DRAM cells. With a given row and column number of the cells, the maximum and minimum loop size of the cells can be determined. After adjusting the loop size, whether the cell is flipped is checked. Then, by measuring the time required for determining loop size, the leakage time of the cell can be determined.

Figure 5:
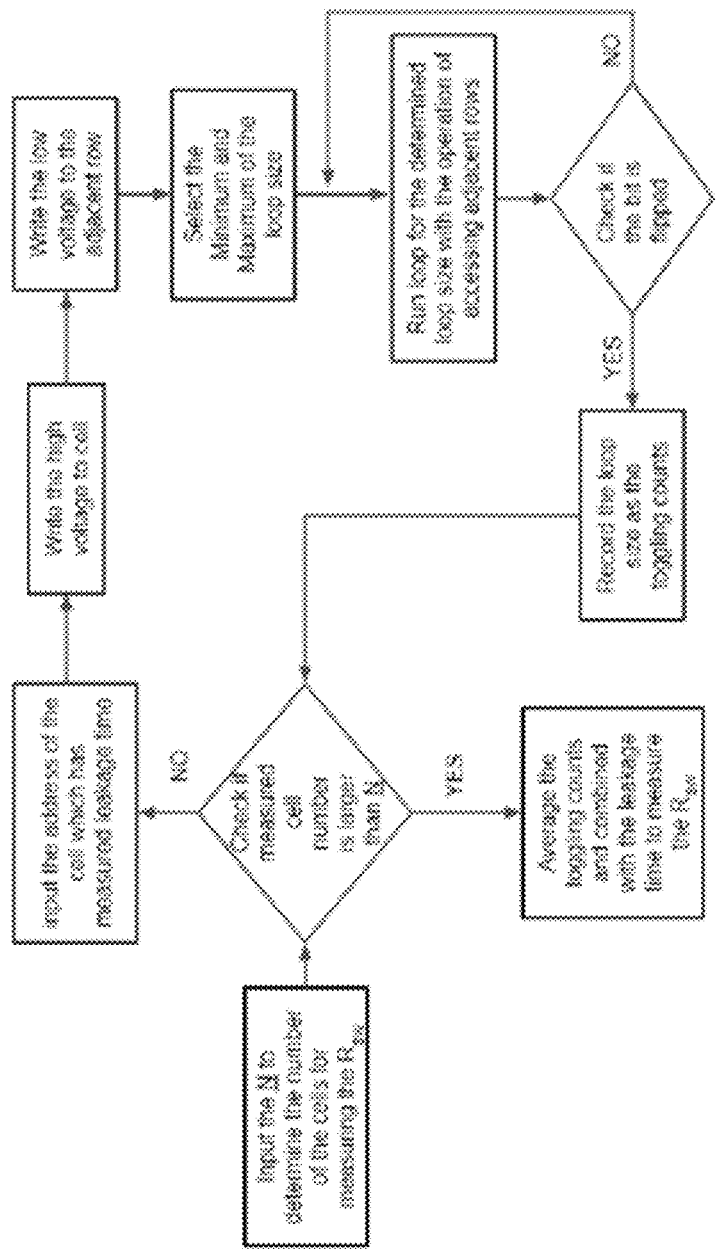
FIG. 5 is a flow diagram illustrating example operations for measuring equivalent resistance of coupling leakage $R_{SW}$ for selected DRAM chips, for use with embodiments of the present disclosure.

FIG. 5 is a flow diagram illustrating example operations for measuring equivalent resistance of coupling leakage $R_{SW}$ for selected DRAM chips, for use with embodiments of the present disclosure. Inputting the number of cells which users want to generate the $R_{SW}$, the cells are randomly chosen first. Then, the rowhammer attack program is run on the chosen cells and the toggling counts are recorded for each cell. By measuring the leakage time of the cells and average toggling counts, the $R_{SW}$ for the DRAM is provided.

Experimental Setup/Results

Experimental platforms with custom memory controllers that provide fine-grained control of DRAM address mapping, page policy, and refresh rate interval were employed to corroborate the abstracted rowhammer circuit-level model against an arbitrary DRAM module.

DDR3 Experimental Platform. The Xilinx Zynq-7000 ZC706 evaluation platform, a heterogeneous development platform containing a dual core ARM Cortex-A9 processor, and reconfigurable logic on the same die were utilized. The ZC706 hosts a Kintex-7 FPGA with one DDR3 SODIMM slot. The time parameters for the experiment platform is listed in Table 2. The SoC bare-metal was run, as well as experiment programs start executing in DRAM from the processor side.

TABLE 2

DRAM Timing Parameters

| Timings | Value | Unit | Description |
|---|---|---|---|
| tcke | 5 | ns | CKE tnininum pulse width |
| tfaw | 30 | ns | Four Address Width |
| tras | 35 | ns | Active to Precharge command |
| trcd | 13.75 | ns | Active to Read or write delay |
| trefi | 7.8 | ns | Average period refresh interval |
| trfc | 110 | ns | Refresh to Active/Refresh |
| trp | 13.75 | ns | Precharge command period |
| trrd | 6 | ns | Activate min. command period |
| trtp | 7.5 | ns | Read to Precharge delay |
| twtr | 7.5 | ns | Rank write to read delay |

DDR4 Experimental Platform. The Xilinx ZYNQ UltraScale+ ZCU104, a developmental platform containing an ARM Cortex-A53 and 16 nm FinFET+ programmable logic (PL) was used. The ZCU104 includes a 64-bit PL DDR4 SODIMM Connector. The testing process of DDR4 is the same as that in the DDR3 platform.

Memory Controller. The FPGA was configured as a DDR memory controller using the Xilinx 7 series memory interface generator. The same parameters were used for each DRAM evaluated to normalize the results. Physical addressing was configured in row-bank-column mode for single rank DDR. Bursts were configured to be handled sequentially. This memory controller uses a closed-page policy by default. When evaluating leakage times, DRAM cell refresh is disabled by configuring the user refresh parameter to TRUE.

DRAM Chips. In Table 3, the DDR3 and DDR4 modules used for the experiment are listed. The DRAM brands are from various manufacturers including Samsung, Kingston, Hynix, Micron, Axiom, Corsair, Crucial, TimeTec.

TABLE 3

Tested DRAM Modules

| DRAM | Type | $R_L$ ($\times 10^{16}$ Ohm) | $R_{SW}$ ($\times 10^9$ Ohm) |
|---|---|---|---|
| Axiom_1 | DDR3 | 6.24-8.17 | 81.4-83.9 |
| Corsair_1 | DDR3 | 2.40-9.13 | 51.9-58.9 |
| Corsair_2 | DDR3 | 1.43-7.69 | 52.9-62.9 |
| Crucial_1 | DDR3 | 5.76-9.13 | 95.4-99.9 |
| Hynix_1 | DDR3 | 1.92-7.69 | 81.9-95.9 |
| Hynix_2 | DDR3 | 3.84-5.76 | 83.9-87.9 |
| Kingston_1 | DDR3 | 1.43-9.61 | 155.0-202.0 |
| Kingston_2 | DDR3 | 1.43-8.65 | 157.0-202.0 |
| Micron_1 | DDR3 | 4.79-8.65 | 157.0-256.0 |
| Samsung_1 | DDR3 | 3.36-9.61 | 155.0-176.0 |
| Samsung_2 | DDR3 | 4.80-8.17 | 127.0-134.0 |
| TimeTec_1 | DDR4 | 1.82-2.40 | 1.68-1.69 |
| HyperX_1 | DDR4 | 0.48-2.40 | 0.82-0.86 |

In order to compute $R_L$ for any given cell, the inherent leakage time of the cell is determined. Example pseudo-code in FIG. 8 illustrates an example process for determining leakage time, according to various embodiments. For each DRAM, the process iterates over every row within the DRAM. For each row, for example, the following steps may be performed.

Activate the row and wait a LEAKAGE_MIN time;
After waiting, the row is read back and checked for corruption;

A cell that has leaked its charge is then reported to have a leakage time less than LEAKAGE_MIN.

This operation can be performed for a LEAKAGE_MAX duration of time. After the cell leakage time is measured, the value in Equation 1 may be used to calculate the $R_L$.

In order to compute $R_{SW}$ for a given cell in Equation 5, the activation time of the adjacent aggressor row to flip a bit in that cell is needed. For a victim cell under observation, $R_{SW}$ represents the likelihood of being discharged by repeated aggressor activation. That is, $R_{SW}$ is the resistance to withstanding a rowhammer attack. The present embodiments provide for quantifying this resistance at a per cell granularity.

Example pseudo-code in FIG. 9 illustrates an example process for determining a number of aggressor row activations required to compute $R_{SW}$, according to embodiments of the present disclosure. For each DRAM, the process iterates over every row in the DRAM. For each victim row a double-sided rowhammer attack is run using the following steps.

Activate physically adjacent rows an ACTVS_MIN number of times;
Check the victim row for corruption;
A cell that has flipped due to the attack is then reported to have activation count less than ACTVS_MIN.

Figure 10:
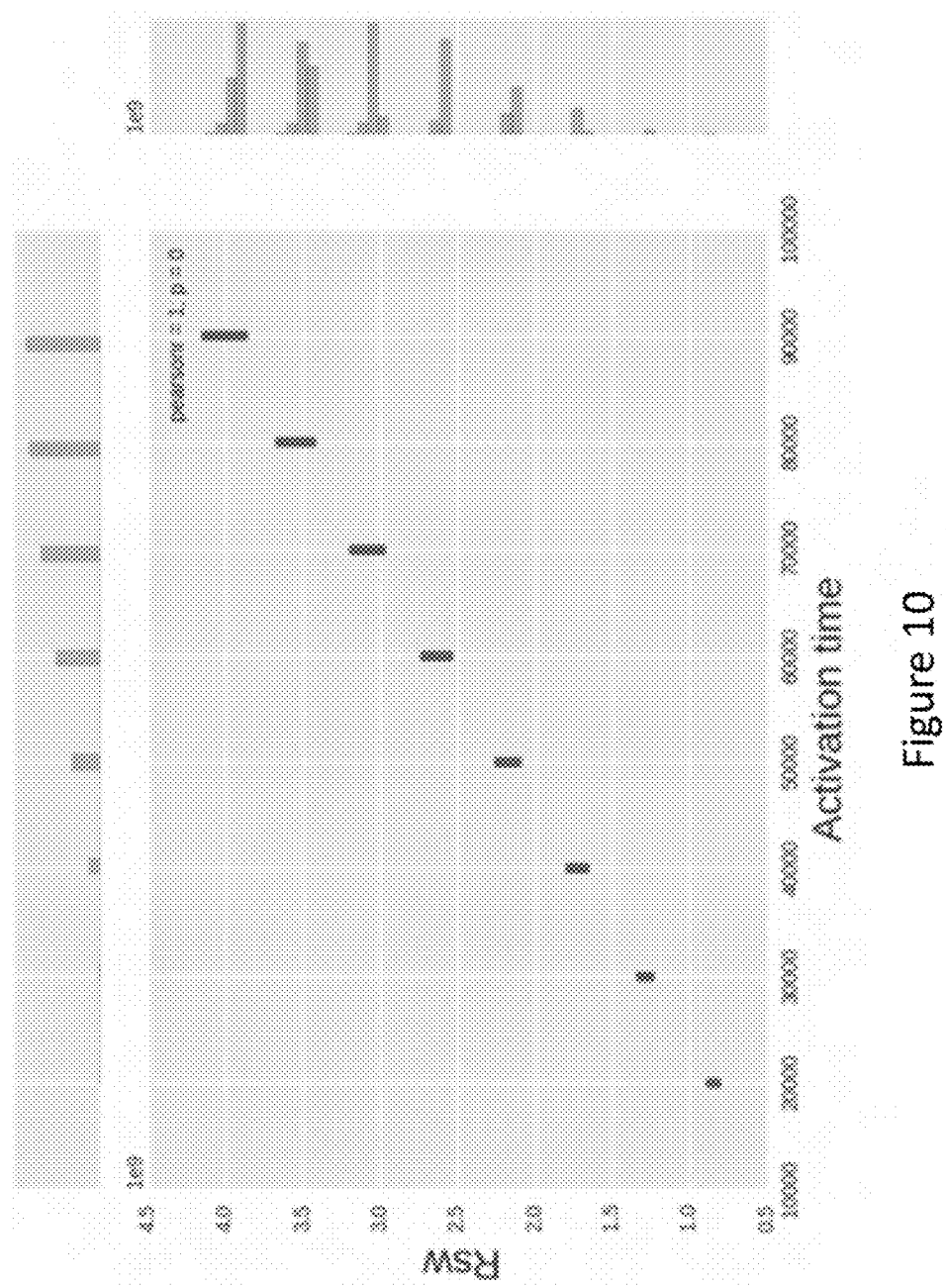
FIG. 10 illustrates example experimental results associated with embodiments of the present disclosure.
Figure 11:
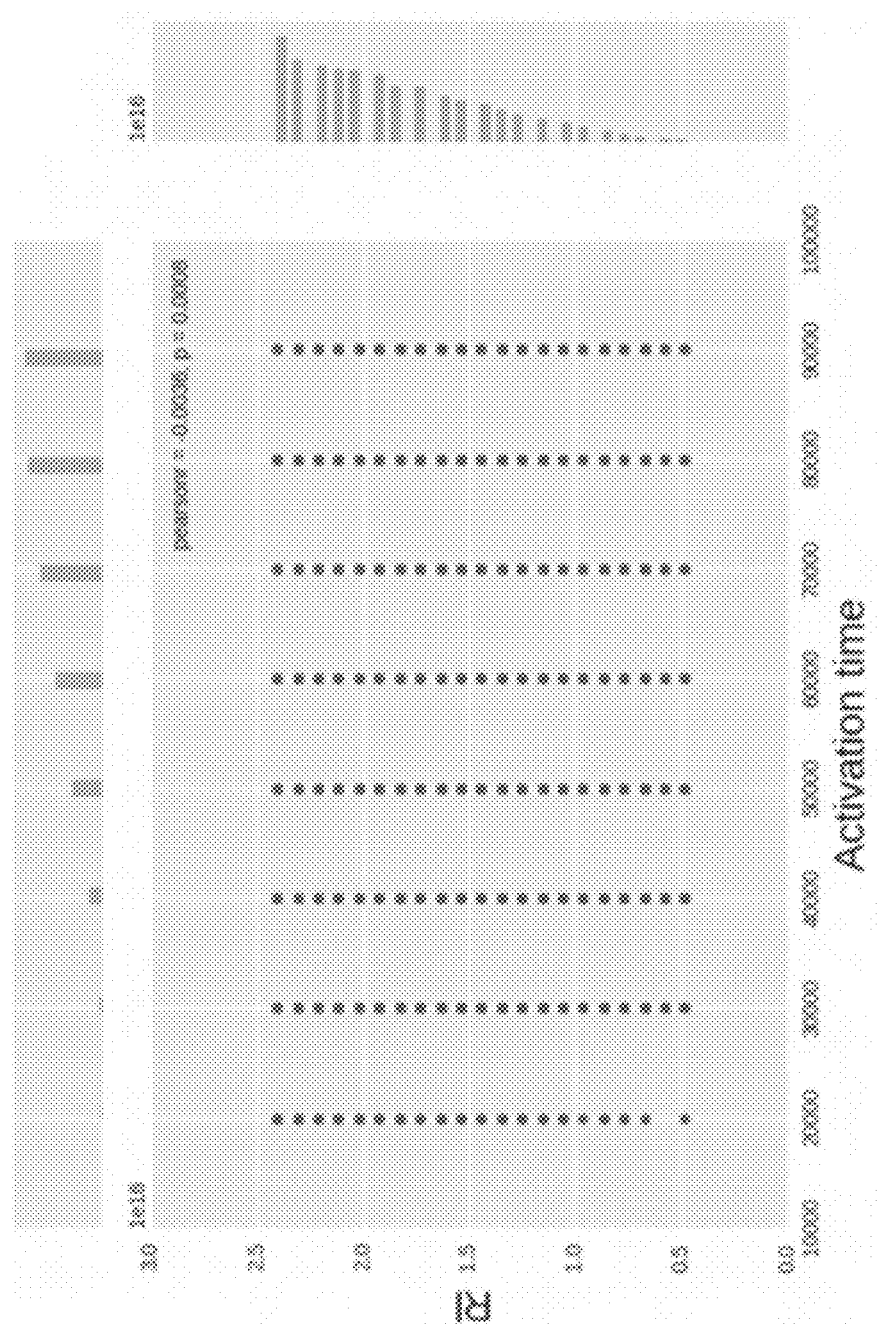
FIG. 11 illustrates example experimental results associated with embodiments of the present disclosure.

Attribute 1: To verify Attribute 1 for the present model, one 4 GB HyperX DDR4 is used as the testing chip and calculate $R_L$ and $R_{SW}$ for all cells on this chip. Cells with both $R_{SW}$ and $R_L$ value are chosen and separated upon the different activation time of the aggressive row. The result is demonstrated in FIG. 10 and FIG. 11. Illustrated in FIGS. 10 and 11, both $R_L$ and $R_{SW}$ have certain range of value corresponding to each aggressive row activation time, e.g., $R_{SW}$ varies from $3.4*10^9$ Ohm to $3.6*10^9$ Ohm and $R_L$ ranges from $0.5*10^{16}$ Ohm to $2.5*10^{16}$ Ohm for 80,000 activation time. To investigate if the phenomenon is common situation across all DRAM modules, the measurement is repeated for the different DRAMs listed in Table 3, and the range of $R_{SW}$ (the third column in Table 3) and the range of $R_{SW}$ (the fourth column in Table 3) are recorded under each minimum activation time for flipping bits. The varied $R_{SW}$ for all DRAMs demonstrate that the flipping cell has the varied resistance against the aggressive activation operation even under the same activation time. Since the higher resistance (the large value of the $R_{\Sigma\Omega}$) of the cell obtained against the activation operation, a lower $R_L$ requires for the cell to flip under the same activation time. Based on the model where the $R_L$ describes the leakage time of the cell, it is shown that the leakage time contributes to the rowhammer attack along with the activating operation. It also delivers the result that for cells that are flippable, reducing either $R_L$ or $R_{SW}$ makes it more vulnerable.

Figure 12:
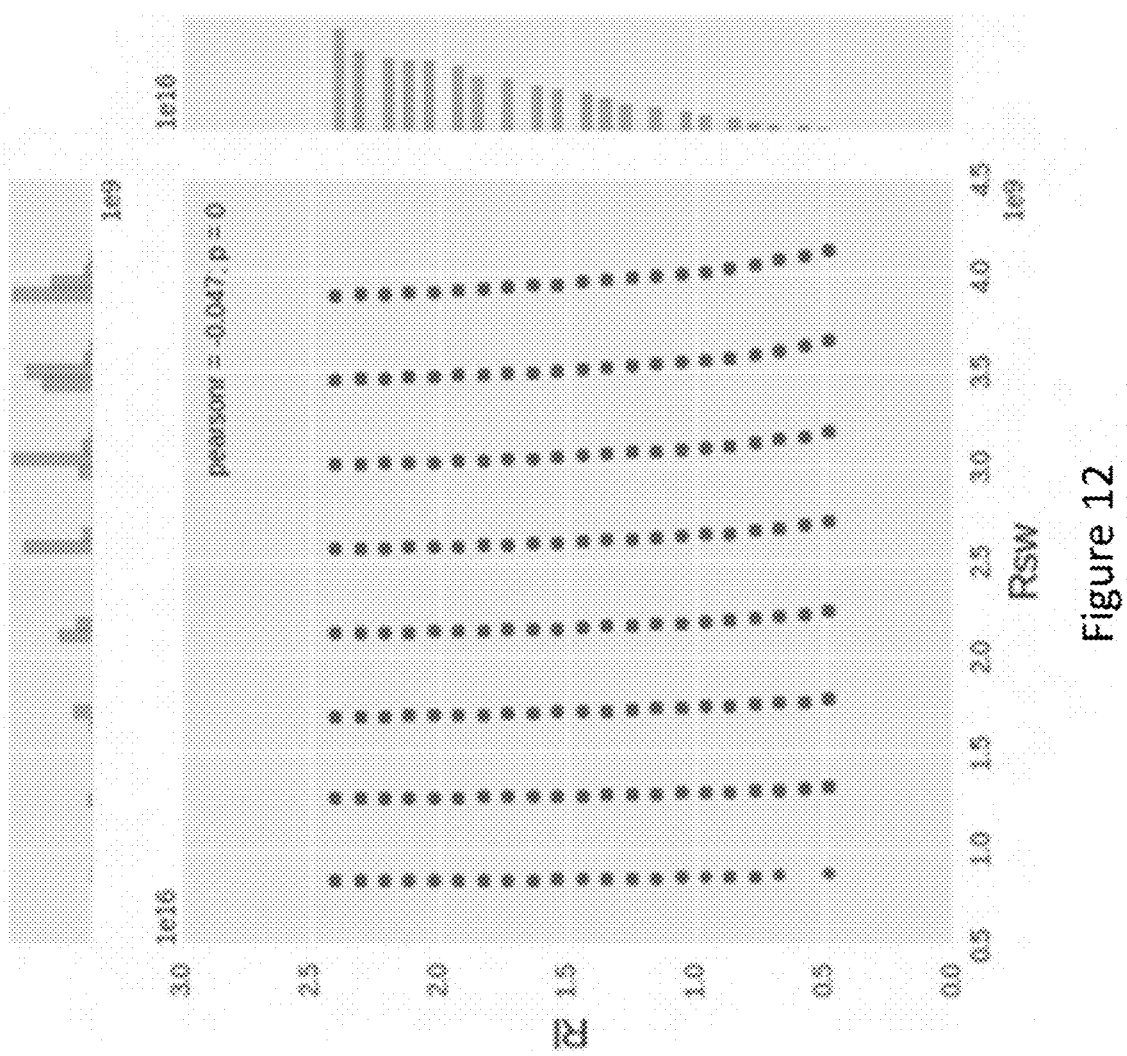
FIG. 12 illustrates example experimental results associated with embodiments of the present disclosure.

Furthermore, the value of $R_{SW}$ and $R_L$ are investigated to identify any correlation between these two parameters, e.g., the lower $R_{SW}$ always has the lower $R_L$ value. In FIG. 12, the results are illustrated for the determined $R_{SW}$ and its corresponding $R_A$ value from a HyperX DDR4 memory. From FIG. 12, it is noted that the $R_L$ always has a large range for any $R_{SW}$. Thus, the value of $R_{SW}$ and $R_L$ do not have observable correlations. This finding also matches prior research that not always the cell with smallest leakage time is the most vulnerable cell to the rowhammer attack. Thus, Attribute 1 is valid.

Attribute 2. For Attribute 2, both $R_L$ and $R_{SW}$ should be fixed. Thus, the same testing configuration is used and the same temperature is maintained in each experiment. A random sequence of aggressive row accessing is required. However, in double-side Rowhammer, it does not allow to change the memory access sequence since two aggressive rows require to access alternately to flush the row buffer. Hence, a random number of interference rows (the interference row is the row which stays in the same bank as the victim rows but different from aggressive row) are inserted between aggressive rows accessing to change the access sequence. An 8 GB TimeTec DDR4 is used as the testing chip and the cells addresses are recorded under different activation time within 128 MB memory space. Next, the interference row inserted double-side rowhammer attack is run to check if the different sequence of memory access influence the bit to flip. In Table 4, the results for 20,000, 30,000 and 40,000 activation time with 5%, 10% interference rows inserted respectively. With the same bit flipping number against the different percent of interference row inserted, the results prove that the access sequence of aggressive row do not effect the bit to flip. The same experiment is run on all other DRAM chips and get similar results, a proof of the Attribute 2.

TABLE 4

Interference Row Results

| Activation time | Iterference row percent | Bit flipping |
|---|---|---|
| 20,000 | 5% | 0 |
| 20,000 | 10% | 0 |
| 30,000 | 5% | 132 |
| 30,000 | 10% | 132 |
| 40,000 | 5% | 1028 |
| 40,000 | 10% | 1028 |

Row Hammer on DDR4 Memory

A many-side Rowhammer (e.g., n-side Rowhammer) has been proposed to bypass the TRR mechanism and induce the bit flipping in DDR4 memory. Indicated by the present model, the toggling count is determined if the certain parameters are given. That is, the activation time to induce the bit flipping should be same under the same platform configuration and the same testing environment. Thus, the n-side rowhammer attack should have n aggressor rows to successfully flip the bits if the TRR is bypassed. Specifically, if an n1-side attack (n1>2) can successful flip the bit, then for any n2-side attack (n2>n1) should also be successful to induce the bit flipping if the same activation time can be applied.

The n-side rowhammer attack was repeated herein on various DDR4 memory to show the correctness of the present findings. In the experiment, the same experiment platform described above was used and the 8 GB TimeTec DDR4 was used as the testing memory chip. Those cells which are vulnerable to the 3-side rowhammer attack were selected with 50,000 activation time within 20 MB memory space. The n-side attack is then increased from 3-side to 6-side but keep the activation time fixed to 50,000 for the aggressive row. In Table 5, it is demonstrated that the flipping bit count for different n-side rowhammer attack. The result shows only a slightly difference between each experiments.

TABLE 5

Many-side rowhammer attack results

| 3-side attack | 4-side attack | 5-side attack | 6-side attack |
|---|---|---|---|
| 1604 | 1594 | 1587 | 1590 | m-Gap Rowhammer Attack

Relatively low $R_L$ and $R_{SW}$ in DDR4 memory may cause a new m-gap rowhammer attack. It is noted that the new m-gap attack is totally different from the previous n-side attack. In an n-side attack, n describes the total amount of aggressive rows. While in m-gap attack, only two aggressive rows are used and m denotes how many rows between each aggressive row and the victim row.

The present embodiments show that a lower $R_{SW}$ and $R_L$ makes the rowhammer attack easier. Compared to DDR3, the $R_{SW}$ of DDR4, shown in Table 3, is much smaller. Suggested by the present model, it is assumed that DDR4 may be vulnerable to the m-gap rowhammer attack. To validate that the new m-gap rowhammer attack is possible, the attack was performed herein on 256 MB memory space in a TimeTec DDR4 chip under 75 Celsius degrees (the high temperature will further reduce the $R_L$). The auto-refresh is turned off during the experiment. Assume v1 is the victim row number and m1 is the number of rows between the aggressive row and the victim row. The v1+m1 and v1−m1 rows are the aggressive rows for the m-gap rowhammer attack. With m1=2, bit flipping was successfully detected for the TimeTec DDR4 under 2-gap rowhammer attack.

Re-Examination of Existing Work

The developed rowhammer vulnerability prediction framework helps quickly validate the security of an arbitrary DRAM against rowhammer attacks. In case a DRAM is vulnerable, the present framework can also precisely predict those vulnerable DRAM cells. Overall, the developed framework helps to better understand the mechanisms of rowhammer attacks and a micro-view of the rowhammer attack impact which was not provided by any previous rowhammer papers. Therefore, powered by the present prediction framework, existing rowhammer related literature is revisited to see if their conclusions are accurate or misleading.

TABLE 6

Rowhammer attack with different adjacent row values

| Attempt | Data value for '0' | Data value for '1' |
| --- | --- | --- |
| 1 | 22 | 4 |
| 2 | 19 | 3 |
| 3 | 21 | 4 |

Lemmas

Before evaluating existing rowhammer attacks and rowhammer-enabled attacks, three lemmas are introduced to assist the evaluations.

Lemma 1. Double side rowhammer attacks outperform single side rowhammer attacks because double side rowhammer attacks may flip more bits than single side rowhammer attacks. For a specific bit in a DRAM cell, the chance that it is vulnerable to rowhammer attacks is similar in both cases.

While existing work has shown that double side rowhammer attacks are more effective than single side rowhammer attacks, the explanation provided is that two neighboring bits toggling will make the target bit easier to be flipped. This explanation is inaccurate and may only apply to very few DRAM bits in the whole DRAM chip. That is, with two neighboring bits toggling, the chance that the target cell being flipped keep is almost the same when only one neighboring bit is toggling. Instead, the superior of double side rowhammer attacks is its combination of all possible flipping bits of the two single side rowhammer attacks.

Figure 6A:
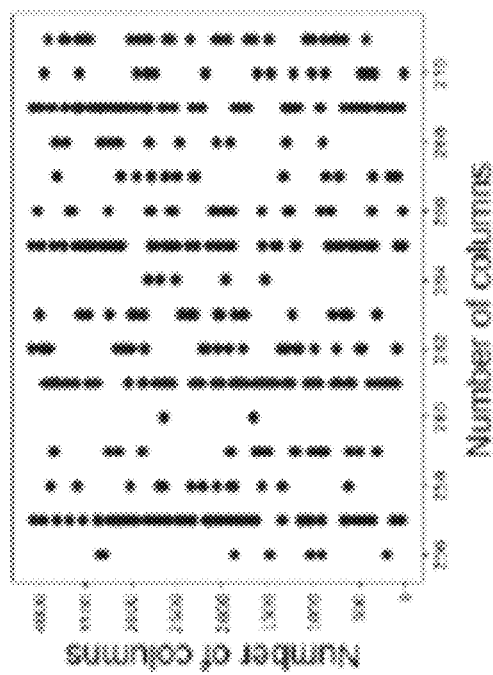
FIGS. 6A and 6B show a flipped bit distribution of the up-side and down-side rowhammer attacks, respectively.
Figure 6B:
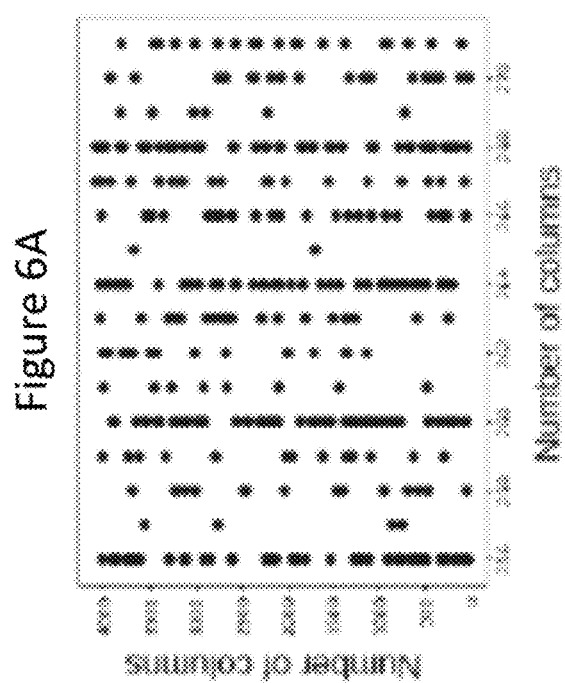
Figure 7:
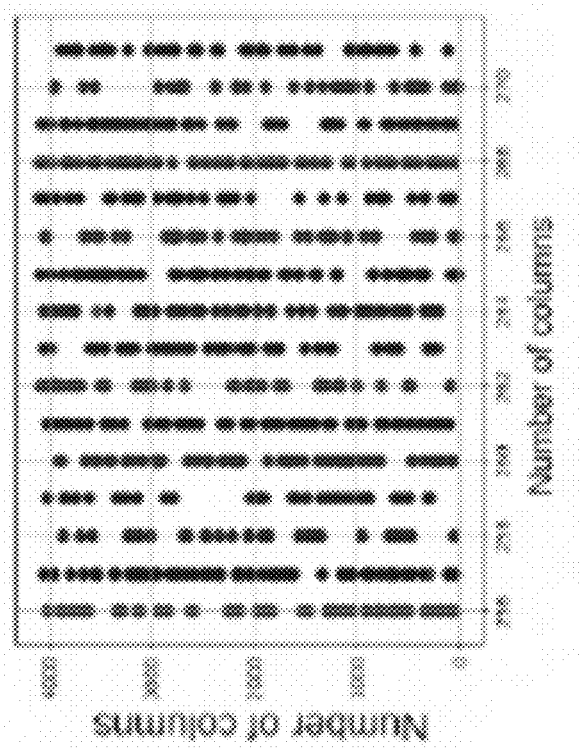
FIG. 7 shows a flipped bit distribution under the double side rowhammer attack.

To prove this lemma, experiments were performed on the embedded DRAM by comparing the double side rowhammer attack outcomes with single side rowhammer attack outcomes. Assuming the victim row is denoted as $r_n$ where n indicates the row number, the rn+1 is denoted as the upper Aggressor row to $r_n$ and $r_n$−1 is the down Aggressor row. If the upper Aggressor row is used to attack the $r_n$, the attack is labeled as the up-side rowhammer attack. Likewise, if the down Aggressor row is used to attack the $r_n$, it is named as the down-side rowhammer attack. FIGS. 6A and 6B show the flipped bit distribution of the up-side and down-side rowhammer attacks, respectively. The x-axis denotes the row number and the y-axis denotes the column number. Each dot in both FIGS. 6A-6B represents the flipping bit. FIG. 7 shows the flipped bit distribution under the double side rowhammer attack. In FIG. 7, the blue dots indicate the flipped DRAM cells which will also occur in the single side rowhammer attacks whereas the red dots mean the new flipped bits which can only be achieved by double side rowhammer attacks. It is shown that there are very few red dots compared the blue dots. From these three figures, a combination of the up-side and down-side rowhammer attacks is found to match the flipped bits of the double side rowhammer attack. As a result, the lemma that double side rowhammer attack is more effective than the single side rowhammer attacks by flipping more bits is proven.

Lemma 2. Both high voltage and low voltage in adjacent Aggressor rows can cause rowhammer attacks although the success rate of high voltage Aggressor rows is much lower than low voltage Aggressor rows.

The Lemma 2 expands the impact of rowhammer attack scenarios since researchers have long believed that only low voltage Aggressor rows can cause rowhammer attacks. That is, in recent rowhammer attacks, the Aggressor rows are always set to '0'. The experiments prove that setting the Aggressor row to '1' can also lead to successful rowhammer attacks although with much lower successful rate. Embedded memory is used for the experiment. First, the '1' is written to the Aggressor Row, the rowhammer attack is launched on the target row. Next, '0' is written to the Aggressive Row and the same attack is launched. In Table 6, the result from three attempts is recorded, each attempts randomly pick 10 rows, then the number of flipping bit for Aggressor row with '0' is listed in second column. The number of flipping bit for Aggressor row with '1' is listed in third column.

Lemma 3. The rowhammer attack leaks charges, causing a high voltage to a low voltage in a DRAM cell. Since a high voltage can mean either a value '1' or a value '0' based on the different coding methods, from the system perspective, the rowhammer attack can cause bit flips from '1' to '0' or from '0' to '1'.

This Lemma is consistent with other rowhammer papers so the proof of Lemma 3 is skipped.

Evaluations of Existing Work

With the present prediction framework, existing conclusions on rowhammer attacks are revisited to verify whether their conclusions are accurate or misleading; second, many papers on rowhammer-enabled attacks rely on the conclusions from previous papers to justify their new attacks. Therefore, if the original conclusions are inaccurate, the new work may not be sound. In this section, state-of-the-art rowhammer attack research and applications are evaluated based on the present prediction framework (more specifically, the four hypotheses and three lemmas presented above).

Existing work can be divided into two categories: 1) More power rowhammer attacks bypassing existing defense; and 2) leveraging rowhammer for other attacks.

In the first category, different methods for triggering the rowhammer vulnerability are presented. For example, "clflush" may be forbidden or monitored by the protecting program to diminish the threaten caused by the rowhammer attack. Researchers propose alternative techniques (e.g., Direct Memory Access (DMA)) to bypass the cache.

The combination of non-temporal instructions, which bypass cache to perform DMA, has been demonstrated to be ubiquitous in the ARM core. All of these instructions have the high possibility to be utilized by the attacker to launch the rowhammer attack. Thus, several non-temporal combination instructions have been evaluated to trigger the rowhammer attack. Based on the results, the combination of DC and ZVA instructions can cause one toggling operation every 70 ns. Based on the present prediction framework, only if the toggling counts within the refresh interval are larger than the threshold, will the attack be successful.

Similar work to the above has proposed non-temporal instructions, memset and memcpy, which can be used to implement the rowhammer attack. Since the memset and memcpy can be used in most operating systems, almost all computing systems are vulnerable to this attack method. However, since toggling counts are important for successful attacks, the non-temporal instructions, memset and memcpy, usually do not execute fast enough to trigger the rowhammer vulnerability. Therefore, it is noted that it is difficult to implement this method for real-world rowhammer attacks.

A cloud-based DMA framework, the Remote Direct Memory Access (RDMA), has also been proposed for the rowhammer attack. RDMA provided by the could service is used to realize the DMA operation. In a 10 Gbps network, the attacker can keep a high-frequency as the maximum speed up to 560000 toggling counts in 64 ms. With a stable network speed, the toggling counts is sufficient to flip the bit for the DRAM whose $R_{SW}$ is lower than $1.1 \times 10^{12}$. Therefore, given that the DRAMs whose $R_{SW}$ is lower than $1.1 \times 10^{12}$, the present framework confirms that the rowhammer attack is piratical to flip the memory bits.

An alternative method to replace the "clflush" by JavaScript (JS) has been proposed. It demonstrates that the rowhammer attack can be implemented to any platform which running the JS environment. However, from results of such demonstrations, the overall speed of the implementation, e.g., the best case for cache eviction requires 179 ns, are longer than the native clflush operation. Therefore, based on Table 5, the method cannot successfully applied to latest DRAM chips with $R_{SW}$ larger than $1.85 \times 10^{12}$.

The second category includes methods that leverage rowhammer for other attacks such as reversing engineer of the Error Correct Code (ECC), compromising the RSA, compromising OpenSSL, DDoS attack on SGX, root privilege leakage attack on Linux, and crossing user privilege leakage in Cloud and Virtual Machine.

Methods which utilize the rowhammer attack to reverse engineer the ECC algorithm may be successful. The main idea is that accessing the error row which is flipped by the rowhammer spends a slightly longer time compared with the error-free rows due to the ECC correcting process. By collecting sufficient error rows, the attacker could infer the ECC algorithm. In the proposed implementations, location constraints of the vulnerable bits are not available and a small number of vulnerable bits can help achieve the goal. In the present framework, $R_{SW}$ and $R_L$ are the inherent parameters for all types of DRAMs. For an ECC DRAM, measurements of the $R_{SW}$ and $R_L$ are similar to non-ECC DRAMs. Further, some test platforms are capable to disable the ECC algorithm for an ECC DRAM, which eliminates the potential impact to the measurement accuracy. Even though DRAMs used in the experiments disclosed herein are non-ECC DRAMs, from the evaluation perspective, the ECC can be treated as the additional function for the DRAM which has no relationship with $R_{SW}$ and $R_L$ Since the only precondition of the paper is that the bit can be flipped, taking the $R_{SW}$ for general prediction is sufficient. Therefore, the methods presented herein are applicable for those DRAMs which are vulnerable to rowhammer attacks.

In other existing work, the rowhammer attack to track the RSA secret key during the decryption step. The "Prime & Probe" is used as well as row buffer collision to determine which bank the RSA exponential address is stored. Then, memory dumping technique is utilized to retrieve the secret key. One challenge is that the attacker needs to implement the rowhammer attack to trigger the bits flipping inside addresses where the exponential number is stored in order to trigger decryption failures. Based on the framework presented herein, the attack is possible, although under a strict condition that the bits storing exponential number is vulnerable to rowhammer attacks.

An existing proposed method to steal the key from the RSA algorithm has been presented wherein it is assumed that only if the Aggressor rows and the victim row have the 0-1-0 pattern, then the target bit can be flipped. However, as proved in Lemma 2 herein, other patterns such as 1-1-1 may also flip the target bit. Thus, the method used to infer the target row bit is incorrect in the proposed method for stealing the key from the RSA algorithm. Further, the method may not collect the correct RSA secret key.

Other existing work has been proposed to exploit the vulnerability of the OpenSSL (e.g., the Bellcore attack on the Garner's CRT re-combination for the RSA implementation). The rowhammer attack is used to flip the '1' to '0' in order to implement the Bellcore attack. However, from Lemma 3, the data pattern depends on the encoding methods by manufacturers, so it is noted herein that the method may fail even through the memory chip is vulnerable to the rowhammer attack.

Other existing work has been proposed including a double side rowhammer attack on a cloud server to get the victim users' privilege when two accounts share the same memory space. This attack significantly jeopardizes the cloud server and threatens user privacy. Several error bits appeared in the shared memory space are enough for the malicious user to perform the attack. While such a rowhammer attack may be possible on desktop equipped with non-ECC DDR3 memory, but the discussion regarding performing similar attacks in the cloud is not applicable for two reasons. First, cloud servers normally use ECC DRAM which significantly lower the attack successful rate. Second, this method cannot be applied to the cloud servers equipped with DDR4 memory.

Other existing work has extended the rowhammer attack to the mobile platform. In the attack, the method first finds one rowhammer vulnerable bit, and then delicately arranges the address of the memory. Through these operations, the attacker can get the root privilege by flipping the desired page table entry. This attack on the mobile platform appears to be feasible as far as that the mobile platform uses rowhammer vulnerable DDR3 memory.

Other existing work has proposed utilizing the Cache Allocation Technology (CAT) mechanism to replace the "clflush" operation in order to accelerate the communication speed of accessing the DRAM. In such existing work, the CAT can decrease 50 cycles in a single toggling operation compared with the "clflush" operation. The experiment platform is the Intel Xeon D-1541 Broadwell processor with DDR4 memory. Based on the present prediction framework, the method appears sufficient to trigger rowhammer attacks on those DDR3 memory which have the rowhammer vulnerability.

Several works focus on the circuit-level explanation for the rowhammer attack. A 3D CAD model with a single charge trap has been proposed to simulate the rowhammer effect. As a demonstration, the charge pumping process governs it, which consists of captured charges around an Aggressor WL and carriers migrate to victim WL. The works note that the shrinking feature size exacerbates the rowhammer effect.

The gamma radiation also impacts the rowhammer attack like the temperature. Other existing work presents that the memory cells exposed to the gamma radiation are more affected so that the data inside those cells are easier to be flipped over. Evidence is provided that the shortest retention time cells are no relevant with those vulnerable cells against the rowhammer attack. It has been proposed that the rowhammer attack is influenced by $t_{RAS}$ and $t_P$. Mostly, $t_P$ takes responsibility for the rowhammer attack.

In order to make learning rowhammer easier, recent studies provide powerful tools to efficiently analyze the rowhammer effects over different platforms. As a widely used experimental platform, it is flexible to repeat the rowhammer attack by using an FPGA board. However it is hard to control the memory access via the FPGA. An FPGA-based memory controller SoftMC has been provided to access all DRAM parameters and control the DRAM with direct memory access. A Raspberry Pi operating system has been presented without complicating the hash function from the virtual address to physical address. Thus a simple linear mapping can be provided to determine the adjacent rows.

Since a delicate XOR function for physical address mapping is widely applied in modern CPUs to alleviate the bank collide, discovering two adjacent rows before rowhammer attack happening is another challenge. Studies on reverse engineering the physical address mapping have been presented to effectively perform the rowhammer attack. Besides, accessing DRAM requires avoiding data caught by the cache.

The secure frameworks against the rowhammer attack can be divided into software- and hardware-based mechanisms. From the software-based perspective, ANVIL demonstrates the solution that uses the Intel performance counter to detect suspicious memory accessing behavior. If the malicious program tends to read one specific address at a high frequency which is beyond the pre-set threshold, the adjacent rows will be refreshed immediately to prevent the bit flipping. The shortage of this technique is that it relies on the CPU counters to recognize the malicious attacks. Thus it cannot protect the machines lacking this feature. Besides, the rowhammer attack proved to success in a relative low accessing time. It means that the threshold could vary in different types of DRAMs.

Another practical software-based framework called CATT has been proposed. The original framework was designed to introduce a bootloader extension which helps to block the vulnerable row in the DRAM. However, the row in the blacklist cannot be accessed by both attacker and user. The worst case is that up to 95% of the memory is wasted. To improve the memory usage, a memory allocation is alternatively added which isolates the user and kernel space to settle the kernel space in the immutable address range. The framework restricts the attacker of implementing the kernel privilege leakage from user space, but it does not avoid the cross user program attacking.

Compared with software-based protection, the hardware-based secure framework is more straightforward. It has been suggested that double the refresh rate of the DRAM can efficiently reduce the damage against rowhammer attack. Unfortunately, the method is proved to diminish the performance of the DRAM significantly. ECC DRAM is another well-developed protection which automatically checks and corrects the error bits due to the memory fault. However, as the rowhammer attack triggers several positions in a single row, ECC is not insufficient to fix all of the faults. For the new generation LPDDR4 chip, two new features Target Row Refresh (TRR) and Maximum Activation Count (MAC) are introduced as the standard against the rowhammer attack. Both of them support the memory controller to refresh the adjacent rows while detecting the suspicious operation.

The present invention is not to be limited in scope by the embodiments disclosed herein, which are intended as single illustrations of individual aspects of the invention, and any which are functionally equivalent are within the scope of the invention. Various modifications to the models and methods of the invention, in addition to those described herein, will become apparent to those skilled in the art from the foregoing description and teachings, and are similarly intended to fall within the scope of the invention. Such modifications or other embodiments can be practiced without departing from the true scope and spirit of the invention.

It should be understood that the examples and embodiments described herein are for illustrative purposes only and that various modifications or changes in light thereof will be suggested to persons skilled in the art and are to be included within the spirit and purview of this application.

The invention claimed is:

1. A method of predicting rowhammer attack vulnerability of one or more memory cells of a direct random access memory (DRAM) chip, the DRAM chip comprising a plurality of memory cells, the method comprising:

for each memory cell of a subset of memory cells of the plurality of memory cells, determining a leakage time t;

determining a resistance of intrinsic leakage $R_L$ based at least in part on the leakage time t;

determining an activation time of an adjacent aggressor row to flip a bit in the memory cell;

determining a resistance of coupling leaking $R_{SW}$ based at least in part on the activation time;

measuring a toggling count; and identifying, based at least in part on one or more of the $R_{SW}$, $R_L$, or toggling count, whether the direct random memory access (DRAM) chip is vulnerable to a rowhammer attack.

2. The method of claim 1, wherein identifying whether the DRAM chip is vulnerable to a rowhammer attack comprises comparing the toggling counts of the memory cells to a predicted row hammer attack toggling count.

3. The method of claim 1, wherein determining the leakage time t comprises:
   activating a row containing the memory cell for a minimum leakage time;
   reading the row; and
   upon determining that the memory cell has leaked, determining that the leakage time t for the memory cell is less than the minimum leakage time.

4. The method of claim 1, wherein determining the activation time of an adjacent aggressor row to flip a bit in the memory cell comprises:
   activating physically adjacent rows to the memory cell for a minimum number of activations;
   reading a row containing the memory cell; and
   upon determining that at least one bit in the memory cell has flipped due to the activating, determining that the activation count is less than the minimum number of activations.

5. The method of claim 1, wherein the toggling count for a memory cell comprises a number of times the memory cell needs to be accessed in order to produce a bit flip in the memory cell.

6. The method of claim 2, wherein the DRAM chip is identified as vulnerable to the rowhammer attack when one or more memory cells of the subset of memory cells is identified as vulnerable to the rowhammer attack.

7. An apparatus for predicting rowhammer attack vulnerability of one or more memory cells of a direct random access memory (DRAM) chip, the DRAM chip comprising a plurality of memory cells, the apparatus comprising at least one processor and at least one memory storing instructions that, with the at least one processor, configure the apparatus to:
   for each memory cell of a subset of memory cells of the plurality of memory cells,
      determine a leakage time t;
      determine a resistance of intrinsic leakage $R_L$ based at least in part on the leakage time t;
      determine an activation time of an adjacent aggressor row to flip a bit in the memory cell;
      determine a resistance of coupling leaking $R_{SW}$ based at least in part on the activation time;
      measure a toggling count; and
      identify, based at least in part on one or more of the $R_{SW}$, $R_L$, or toggling count, whether the direct random memory access (DRAM) chip is vulnerable to a rowhammer attack.

8. The apparatus of claim 7, wherein identifying whether the DRAM chip is vulnerable to a rowhammer attack comprises comparing the toggling counts of the memory cells to a predicted row hammer attack toggling count.

9. The apparatus of claim 7, wherein determining the leakage time t comprises:
   activating a row containing the memory cell for a minimum leakage time;
   reading the row; and
   upon determining that the memory cell has leaked, determining that the leakage time t for the memory cell is less than the minimum leakage time.

10. The apparatus of claim 7, wherein determining the activation time of an adjacent aggressor row to flip a bit in the memory cell comprises:
    activating physically adjacent rows to the memory cell for a minimum number of activations;
    reading a row containing the memory cell; and
    upon determining that at least one bit in the memory cell has flipped due to the activating, determining that the activation count is less than the minimum number of activations.

11. The apparatus of claim 7, wherein the toggling count for a memory cell comprises a number of times the memory cell needs to be accessed in order to produce a bit flip in the memory cell.

12. The apparatus of claim 8, wherein the DRAM chip is identified as vulnerable to the rowhammer attack when one or more memory cells of the subset of memory cells is identified as vulnerable to the rowhammer attack.

13. A computer program product for predicting rowhammer attack vulnerability of one or more memory cells of a direct random access memory (DRAM) chip, the DRAM chip comprising a plurality of memory cells, the computer program product comprising at least one non-transitory computer storage medium storing instructions that, with at least one processor, configure an apparatus to:
    for each memory cell of a subset of memory cells of the plurality of memory cells,
       determine a leakage time t;
       determine a resistance of intrinsic leakage $R_L$ based at least in part on the leakage time t;
       determine an activation time of an adjacent aggressor row to flip a bit in the memory cell;
       determine a resistance of coupling leaking $R_{SW}$ based at least in part on the activation time;
       measure a toggling count; and
       identify, based at least in part on one or more of the $R_{SW}$, $R_L$, or toggling count, whether the direct random memory access (DRAM) chip is vulnerable to a rowhammer attack.

14. The computer program product of claim 13, wherein identifying whether the DRAM chip is vulnerable to a rowhammer attack comprises comparing the toggling counts of the memory cells to a predicted row hammer attack toggling count.

15. The computer program product of claim 13, wherein determining the leakage time t comprises:
    activating a row containing the memory cell for a minimum leakage time;
    reading the row; and
    upon determining that the memory cell has leaked, determining that the leakage time t for the memory cell is less than the minimum leakage time.

16. The computer program product of claim 13, wherein determining the activation time of an adjacent aggressor row to flip a bit in the memory cell comprises:
    activating physically adjacent rows to the memory cell for a minimum number of activations;
    reading a row containing the memory cell; and
    upon determining that at least one bit in the memory cell has flipped due to the activating, determining that the activation count is less than the minimum number of activations.

17. The computer program product of claim 13, wherein the toggling count for a memory cell comprises a number of times the memory cell needs to be accessed in order to produce a bit flip in the memory cell.

18. The computer program product of claim 14, wherein the DRAM chip is identified as vulnerable to the rowhammer attack when one or more memory cells of the subset of memory cells is identified as vulnerable to the rowhammer attack.

* * * * *

UNITED STATES PATENT AND TRADEMARK OFFICE
CERTIFICATE OF CORRECTION

PATENT NO. : 11,887,686 B2
APPLICATION NO. : 17/357265
DATED : January 30, 2024
INVENTOR(S) : Jin et al.

Page 1 of 1

It is certified that error appears in the above-identified patent and that said Letters Patent is hereby corrected as shown below:

On the Title Page

Item (73) Assignee, Please change "University of Florida Research Foundation, Incorporated, Gainesville, FL (US); Washington University, St Louis, MI (US)" to --University of Florida Research Foundation, Incorporated, Gainesville, FL (US); Washington University, St Louis, MO (US)--.

Signed and Sealed this
Twenty-second Day of October, 2024

Katherine Kelly Vidal
*Director of the United States Patent and Trademark Office*